Patented Aug. 29, 1939

2,170,803

UNITED STATES PATENT OFFICE 2,170,803

PHOTOGRAPHIC SENSITIZING DYES AND THEIR PREPARATION

Leslie G. S. Brooker, Rochester, N. Y., assignor, by mesne assignments, to Eastman Kodak Company, Jersey City, N. J., a corporation of New Jersey No Drawing. Application August 11, 1934, Serial No. 739,502

12 Claims. (Cl. 260—240)

This invention relates to a new class of dyes and methods for their preparation. More particularly it relates to dyes which I have termed N-alkyl-heterocyclylidene derivatives and N-alkyl-heterocyclylidene-ethylidene derivatives of heterocyclic compounds containing a reactive methylene group.

The dyes of this new class are characterized by containing the following broad grouping:

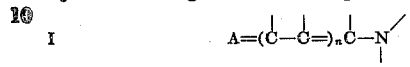

In this formula A represents an atom such as oxygen or sulphur, $n$ represents a positive integer and the nitrogen atom is situated in a heterocyclic ring system.

More specifically, this new class of dyes is characterized by the following grouping:

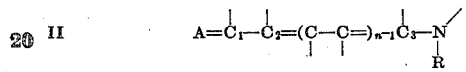

In this formula A represents an atom such as oxygen or sulfur, R represents an alkyl group, $n$ represents a positive integer, the carbon atoms $C_1$ and $C_2$ are situated in a heterocyclic ring system and the carbon atom $C_3$ and the nitrogen atom are situated in another heterocyclic ring system.

While the dyes are quite new, even as a class, it is interesting to note that the extent of the class and the number of dyes included therein are comparable to the well known class of cyanine dyes which have been years in their discovery and development and which contain the following grouping:

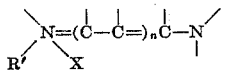

wherein R and R' represent alkyl groups, $n$ represents a positive integer, X represents an acid radical and the nitrogen atoms are each situated in a heterocyclic ring system.

It is an object of this invention, therefore, to provide a new class of dyes characterized by the above structure (I) and/or by the above structure (II) and which I have termed N-alkyl-heterocyclylidene and N-alkyl-heterocyclylidene-ethylidene derivatives of heterocyclic compounds containing a reactive methylene group. A further object of this invention is to provide a process for the preparation of those dyes. Other objects will appear hereinafter.

New dyes containing the structure (II) indicated above may be prepared by condensing a heterocyclic compound containing a reactive methylene group with an alkyl quaternary salt of a 2-iodo-derivative of a pyridine base, a quinoline base or a naphthoquinoline base. Such dyes are called for the sake of convenience N-alkyl-heterocyclylidene derivatives of heterocyclic compounds containing a reactive methylene group. An illustration of the formation of such a dye is as follows:

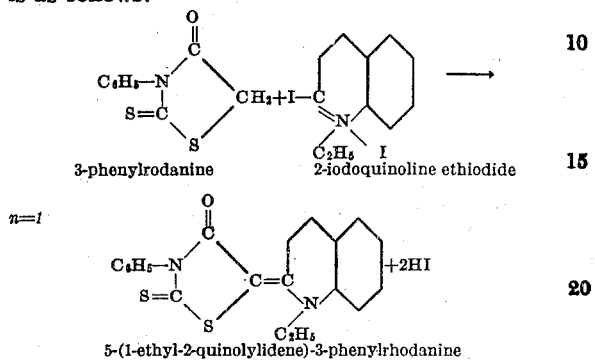

New dyes containing the structure (II) indicated above may also be prepared by condensing a heterocyclic compound containing a reactive methylene group with an alkyl quaternary salt of a β-anilinovinyl derivative or a β-acetanilidovinyl derivative of a heterocyclic nitrogen-containing base, i. e. with a cyclammonium alkyl quaternary salt containing a β-anilinovinyl group in its alpha or gamma position, viz. one of its so-called reactive positions. Such dyes are called, for the sake of convenience, N-alkyl-heterocyclylidene-ethylidene derivatives of heterocyclic compounds containing a reactive methylene group. An illustration of the formation of such a dye is as follows:

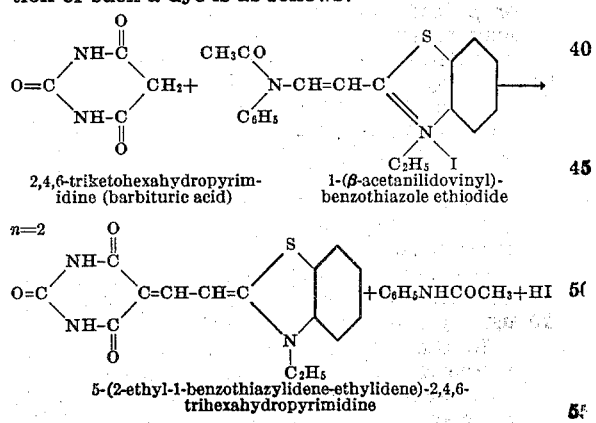

A further illustration is

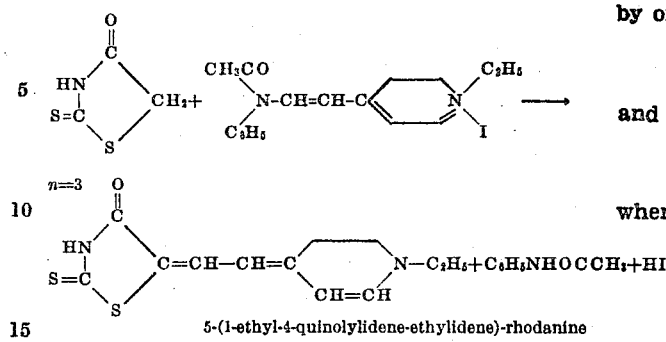

5-(1-ethyl-4-quinolylidene-ethylidene)-rhodanine

The various heterocyclic compounds which contain a reactive methylene group which have been used herein are rhodanine, 3-aminorhodanine, 3-carbethoxymethylrhodanine, 3-ethylrhodanine, 3-(p-dimethylaminophenyl)-rhodanine, 3-phenylrhodanine, 3-phenylaminorhodanine, barbituric acid (2,4,6-triketohexahydropyrimidine), thiobarbituric acid (2-thio-2,4,6-triketohexahydropyrimidine), 1-methyl-3-phenyl-5-thiopyrazolone and thioindoxyl (in the form of thioindoxylic acid). All of these contain the following grouping:

wherein A represents an oxygen or a sulfur atom. The reactivity of the methylene group is undoubtedly dependent upon the fact that it is adjacent to the grouping

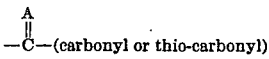 (carbonyl or thio-carbonyl)

Such a group (carbonyl or thiocarbonyl) is spoken of herein as an activating group.

The rhodanines given above may be prepared according to the method given by Holmberg, J. prakt. Chem., 81, 451 (1910), 3-(p-Dimethylaminophenyl)-rhodanine is made from p-aminodimethylaniline using the method described by Holmberg for the preparation of 3-(o-methoxyphenyl)-rhodanine, wherein o-anisidine is employed.

Those condensations, wherein the iododerivatives of quinoline and the like are used, may be effected in the presence of a lower aliphatic alcohol, preferably absolute ethyl alcohol, using a strong tertiary organic base, for instance, triethylamine, as a condensing agent.

The condensations, wherein the β-anilinovinyl or β-acetanilidovinyl derivatives are employed, may be effected in one of the lower aliphatic alcohols, preferably absolute ethyl alcohol, using a strong organic base, triethylamine being suitable for this purpose. Such a dye condensation may be effected also in acetic anhydride, using anhydrous sodium or potassium acetate as the condensing agent. Certain of these condensations proceed better according to the first method given, while in other cases the second method gives better yields.

Some of the reactions described proceed without the application of heat. However, heat is usually employed to accelerate the reaction.

In those cases where thioindoxyl is involved, the corresponding thioindoxylic acid may be used. This acid readily loses carbon dioxide under the conditions of the experiment and hence functions at thioindoxyl.

The herein disclosed dyes can be represented by one of the following general formulas:

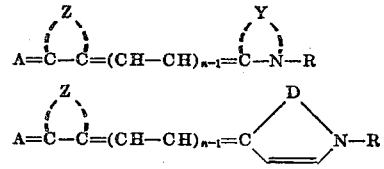

and

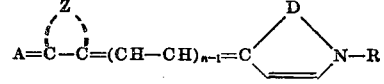

wherein A represents an atom, such as oxygen or sulfur, D represents a phenylene group, n represents a positive integer not greater than two, R represents an alkyl group, Z represents the non-metallic atoms necessary to complete a five-membered or six-membered heterocyclic nucleus and Y represents the non-metallic atoms necessary to complete a five-membered or six-membered heterocyclic nucleus. As indicated in the examples, Z can represent, for instance, the non-metallic atoms necessary to complete a heterocyclic nucleus containing a nuclear nitrogen atom, e. g. a barbituric acid, a rhodanine or a 5-thiopyrazolone nucleus; Z can represent, for instance, the non-metallic atoms necessary to complete a heterocyclic nucleus containing a nuclear sulfur atom, e. g. a thioindoxyl (2-thionaphthenone) nucleus; and Z can represent, the non-metallic atoms necessary to complete a heterocyclic nucleus containing both a nuclear nitrogen and a nuclear sulfur atom, e. g. a rhodanine nucleus. As indicated in the examples, Y can represent, for instance, the non-metallic atoms necessary to complete a heterocyclic nucleus containing a nuclear oxygen atom, e. g. one of the oxazole series, for example, benzoxazole; Y can represent the non-metallic atoms necessary to complete a heterocyclic nucleus containing a nuclear sulfur atom, e. g. one of the thiazole series, for example, benzothiazole, or one of the thiazoline series, for example, thiazoline; and Y can represent the non-metallic atoms, viz. carbon atoms, necessary to complete a heterocyclic nucleus of the pyridine series, the quinoline series or the benzoquinoline series. It is to be understood that all of the herein disclosed dyes can probably exist in two forms which may be referred to as tautomeric forms. The following equation illustrates this probable tautomerism:

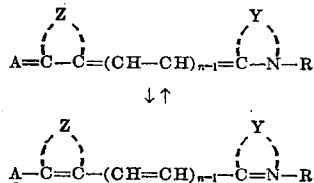

The formulae and nomenclature given herein are thought to be correct and are included for the guidance of those skilled in the art, but should these later be found to require some modification, it must be understood that the compounds dealt with are sufficiently defined by their mode of preparation, irrespective of what their true structure may be.

The following examples are illustrative of the preparation of these new dyes. The proportions used may be varied according to the particular dye being prepared.

EXAMPLES

Example 1.—5-(1-ethyl-2-quinolylidene)-rhodanine 2.66 parts of rhodanine, 8.2 parts of 2-iodoquinoline ethiodide and 4.24 parts of triethylamine were refluxed in 25 parts of absolute ethyl alcohol for about 15 minutes. The dye separated from the hot solution. It was filtered off and recrystallized from glacial acetic acid, giving brownish red needles with a green reflex. The methyl alcohol solution was orange in color.

Example 2.—5-(1-ethyl-2-quinolylidene)-3-phenylrhodanine 2.1 parts of 3-phenylrhodanine and 4.1 parts of 2-iodoquinoline ethiodide were refluxed with 55 parts of absolute ethyl alcohol and 2.1 parts of triethylamine for about fifteen minutes. The dye separated from the cooled solution. It was filtered off and recrystallized from glacial acetic acid, yielding red crystals with a green reflex.

Example 3.—5-(1-ethyl-2-quinolylidene)-2,4,6-triketohexahydropyrimidine 2.6 parts of barbituric acid and 8.2 parts of 2-iodoquinoline ethiodide were refluxed with 200 parts of absolute ethyl alcohol and 4.25 parts of triethylamine for about fifteen minutes. The dye was filtered from the cooled solution. It was recrystallized from methyl alcohol, yielding yellow crystals.

Example 4.—5-(1-ethyl-2-quinolylidene)-2-thio-2,4,6-triketohexahydropyrimidine 1.4 parts of thiobarbituric acid and 4.1 parts of 2-iodoquinoline ethiodide were refluxed with 80 parts of absolute ethyl alcohol and 2.1 parts of thiethylamine for about twenty minutes. The dye was recrystallized from water yielding orange colored crystals.

Example 5.—5-(1-ethyl-2-pyridylidene)-3-phenylrhodanine 2.1 parts of 3-phenylrhodanine and 3.6 parts of 2-iodopyridine ethiodide were refluxed with 2.12 parts of triethylamine and 30 parts of absolute ethyl alcohol for about fifteen minutes. The dye was filtered from the cooled solution. It was recrystallized from methyl alcohol, giving reddish-brown plates which gave a yellow-orange solution in methyl alcohol.

Example 6.—5-(1-ethyl-2-β-naphthoquinolylidene)-3-phenylrhodanine 0.3 part of 3-phenylrhodanine and 0.66 part of 2-iodo-β-naphthoquinoline ethiodide were refluxed with 0.3 part of triethylamine and 15 parts of absolute ethyl alcohol for fifteen minutes. The dye was filtered from the cooled solution. It was recrystallized from glacial acetic acid, giving brick red crystals which gave a red solution in methyl alcohol. β-naphtho-quinoline is also called 5,6-benzoquinoline.

Example 7.—5-(2-ethyl-1-benzoxazylidene-ethylidene)-rhodanine 1.33 parts of rhodanine, 4.34 parts of 1-(β-acetanilidovinyl)-benzoxazole ethiodide and 0.9 part of anhydrous sodium acetate were refluxed in 50 parts of glacial acetic acid for about fifteen minutes. The dye separated from the hot solution. It was filtered off and recrystallized from glacial acetic acid, yielding brownish crystals with a bright blue reflex which gave a brownish-yellow solution in methyl alcohol.

Example 8.—5-(2-ethyl-1-benzothiazylidene-ethylidene)-rhodanine 1.33 parts of rhodanine, 4.5 parts of 1-(β-acetanilidovinyl)-benzothiazole ethiodide and 0.9 part of anhydrous sodium acetate were refluxed in 50 parts of glacial acetic acid for about fifteen minutes. The dye separated from the hot solution. It was filtered off and recrystallized from glacial acetic acid, yielding crystals resembling iron filings which gave a reddish-orange solution in methyl alcohol.

Example 9.—5-(1-ethyl-2-quinolylidene-ethylidene)-rhodanine 1.3 parts of rhodanine and 4.4 parts of 2-(β-acetanilidovinyl)-quinoline ethiodide were refluxed with 50 parts of acetic anhydride and 0.9 part of anhydrous sodium acetate for about ten minutes. The dye was filtered from the cooled solution. It was recrystallized from glacial acetic acid, yielding dark crystals with a blue reflex and giving a purple methyl-alcohol solution.

Example 10.—5-(1-ethyl-4-quinolylidene-ethylidene)-rhodanine 0.34 part of rhodanine, 1.1 parts of 4-(β-acetanilidovinyl)-quinoline ethiodide and 0.22 part of anhydrous sodium acetate were suspended in 12 parts of acetic anhydride. The mixture was heated for about two minutes just under the boiling point. The dye was filtered from the cooled solution. It was recrystallized from ethyl alcohol, yielding reddish-blue crystals which gave a blue methyl alcohol solution.

Example 11.—3-amino-5-(2-ethyl-1-benzoxazylidene-ethylidene)-rhodanine 1.5 parts of 3-aminorhodanine and 4.3 parts of 1-(β-acetanilidovinyl)-benzoxazole ethiodide were refluxed with 35 parts of absolute ethyl alcohol and 1.06 parts of triethylamine for about fifteen minutes. The dye was filtered from the cooled solution. It was recrystallized from acetone, yielding dull red crystals. The methyl alcohol solution was orange in color.

Example 12.—3-carbethoxymethyl-5-(2-ethyl-1-benzoxazylidene-ethylidene)-rhodanine 1.1 parts of 3-carbethoxymethylrhodanine and 2.2 parts of 1-(β-acetanilidovinyl)-benzoxazole ethiodide were refluxed with 20 parts of absolute ethyl alcohol and 0.53 part of triethylamine for about fifteen minutes. The dye was filtered from the cooled solution. It was recrystallized from glacial acetic acid, yielding reddish-orange crystals which gave an orange colored methyl alcohol solution.

Example 13.—3-carbethoxymethyl-5-(1-ethyl-2-quinolylidene-ethylidene)-rhodanine 1.1 parts of 3-carbethoxymethylrhodanine and 2.2 parts of 2-(β-acetanilidovinyl)-quinoline ethiodide were refluxed with 25 parts of acetic anhydride and 0.45 part of anhydrous sodium acetate for about five minutes. The dye was filtered from the cooled solution. It was recrystallized from glacial acetic acid, giving steely blue crystals which gave a bluish-red methyl alcohol solution.

Example 14.—3-(p-dimethylaminophenyl)-5-(2-ethyl-1-benzoxazylidene-ethylidene)-rhodanine 1.25 parts of 3-(p-dimethylaminophenyl)-rhodanine and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from glacial acetic acid, yielding brown crystals with a green reflex and giving a yellow-orange methyl alcohol solution.

EXAMPLE 15.—3-(p-dimethylaminophenyl)-5-(1-ethyl-2-quinolylidene-ethylidene)-rhodanine 1.25 parts of 3-(p-dimethylaminophenyl)-rhodanine and 2.2 parts of 2-(β-acetanilidovinyl)-quinoline ethiodide were refluxed with 25 parts of acetic anhydride and 0.45 part of anhydrous sodium acetate for about five minutes. The dye was filtered from the cooled solution. It was recrystallized from glacial acetic acid, yielding minute greenish crystals which gave a bluish-red solution in methyl alcohol.

EXAMPLE 16. — 3-ethyl-5-(2-ethyl-1-benzoxazylidene-ethylidene)-rhodanine 0.8 part of 3-ethylrhodanine and 2.2 parts of 1-(β-acetanilidovinyl)-benzoxazole ethiodide were refluxed with 20 parts of absolute ethyl alcohol and 0.53 part of triethylamine. The dye was filtered from the cooled solution. It was recrystallized from glacial acetic acid, yielding red prisms with a blue reflex which gave an orange methyl alcohol solution.

EXAMPLE 17.—3-ethyl-5-(1-ethyl-2-quinolylidene-ethylidene)-rhodanine 0.8 part of 3-ethylrhodanine and 2.2 parts of 2-(β-acetanilidovinyl)-quinoline ethiodide were refluxed with 25 parts of acetic anhydride and 0.5 part of anhydrous sodium acetate for about five minutes. The dye was filtered from the cooled solution. It was decrystallized from glacial acetic acid, yielding dark bluish-gray crystals which gave a bluish-red methyl alcohol solution.

EXAMPLE 18. — 5-(2-ethyl-1-benzoxazylidene-ethylidene)-3-phenylrhodanine 2.1 parts of 3-phenylrhodanine and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution and was filtered off. It was recrystallized from glacial acetic acid, yielding glistening red plates with a blue reflex which gave an orange methyl alcohol solution.

EXAMPLE 19.—5-(2-ethyl-1-benzothiazylidene-ethylidene)-3-phenylrhodanine 2.1 parts of 3-phenylrhodanine and 4.5 parts of 1-(β-acetanilidovinyl)-benzothiazole ethiodide were refluxed with 55 parts of absolute ethyl alcohol and 1.06 parts of triethylamine for about twenty minutes. The dye was filtered from the cooled solution. It was recrystallized from glacial acetic acid, yielding small dark crystals with a glittering green reflex which gave a pinkish methyl alcohol solution.

EXAMPLE 20.—5-(1-ethyl-2-quinolylidene-ethylidene)-3-phenylrhodanine 2.1 parts of 3-phenylrhodanine and 4.4 parts of 2-(β-acetanilidovinyl)-quinoline ethiodide were refluxed with 50 parts of acetic anhydride and 0.9 part of anhydrous sodium acetate for about fifteen minutes. The dye was filtered from the cooled solution. It was recrystallized from glacial acetic acid and yielded brown needles with a green reflex which gave a pinkish-brown methyl alcohol solution.

EXAMPLE 21.—5-(1-ethyl-4-quinolylidene-ethylidene)-3-phenylrhodanine 1.05 parts of 3-phenylrhodanine and 2.2 parts of 4-(β-acetanilidovinyl)-quinoline ethiodide were refluxed with 25 parts of acetic anhydride and 0.45 part of sodium acetate for about five minutes. The dye was filtered from the cooled solution and was recrystallized from glacial acetic acid yielding dark blue crystals which gave a blue methyl alcohol solution.

EXAMPLE 22.—5-(2-ethyl-1-benzoxazylidene-ethylidene)-3-phenylaminorhodanine 1.1 parts of 3-phenylaminorhodanine and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from glacial acetic acid, yielding reddish brown crystals which had a blue reflex and which gave a pinkish-orange methyl alcohol solution.

EXAMPLE 23.—5-(1-ethyl-2-quinolylidene-ethylidene)-3-phenylaminorhodanine 1.1 parts of 3-phenylaminorhodanine and 2.2 parts of 2-(β-acetanilidovinyl)-quinoline ethiodide were refluxed with 25 parts of acetic anhydride and 0.45 part of anhydrous sodium acetate for five minutes. The dye was filtered from the cooled solution. It was recrystallized from glacial acetic acid and yielded dark metallic crystals which gave a bluish-red methyl alcohol solution.

EXAMPLE 24.—5-(3-methyl-2-thiazolinylidene-ethylidene)-3-phenylrhodanine 2.1 parts of 3-phenylrhodanine and 3.9 parts of 2-(β-acetanilidovinyl)-thiazoline methiodide were refluxed with 50 parts of acetic anhydride and 0.9 part of anhydrous sodium acetate for fifteen minutes. The dye was filtered from the cooled solution. It was recrystallized from glacial acetic acid, yielding brown needles with a blue reflex which gave a yellow methyl alcohol solution.

EXAMPLE 25.—5-(2-ethyl-1-benzoxazylidene-ethylidene)-2,4,6-triketohexahydropyrimidine 1.3 parts of barbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded bright yellow crystals which gave a yellow methyl alcohol solution.

EXAMPLE 26. — 5-(2-ethyl-1-benzothiazylidene-ethylidene)-2,4,6-triketohexahydropyrimidine 2.6 parts of barbituric acid, 9 parts of 1-(β-acetanilidovinyl)-benzothiazole ethiodide and 1.8 parts of anhydrous sodium acetate were suspended in 50 parts of acetic anhydride. This mixture was heated just under the boiling point for about one minute. The dye separated from the cooled solution and was filtered off. It was recrystallized from dilute acetic acid, yielding minute crystals with a blue reflex which gave a yellow-orange methyl alcohol solution.

EXAMPLE 27.—5-(2-ethyl-1-benzoxazylidene-ethylidene)-2-thio-2,4,6-triketohexahydropyrimidine 1.4 parts of thiobarbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded an orange-yellow crystalline powder which gave a yellow methyl alcohol solution.

EXAMPLE 28. — 5 - (2 - ethyl-1-benzothiazylidene-ethylidene)-2-thio-2,4,6 - triketohexahydropyrimidine 1.4 parts of thiobarbituric acid and 4.5 parts of 1-(β-acetanilidovinyl)-benzothiazole ethiodide were refluxed with 30 parts of absolute ethyl alcohol and 1.06 parts of triethylamine for about fifteen minutes. The dye was filtered from the cooled solution. It was recrystallized from pyridine and gave dull red crystals which gave a reddish-orange methyl alcohol solution.

EXAMPLE 29.—4-(ethyl-1-benzoxazylidene-ethylidene)-3-methyl-1-phenyl-5-thiopyrazolone 0.95 part of 3-methyl-1-phenyl-5-thiopyrazolone and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from methyl alcohol, yielding brownish crystals with a green reflex which gave a reddish-orange methyl alcohol solution.

EXAMPLE 30. — (2 - ethyl - 1 - benzothiazylidene-ethylidene)-thioindogenide 0.97 part of thioindoxylic acid, 2.25 parts of 1-(β-acetanilidovinyl)-benzothiazole ethiodide and 0.5 part of triethylamine were refluxed in 15 parts of absolute ethyl alcohol for about fifteen minutes. The dye was filtered from the cooled solution. It was recrystallized from methyl alcohol giving purplish needles and a crimson methyl alcohol solution.

The herein disclosed dyes can be called dyes of the merocyanine class. Those in which a heterocyclic nucleus is linked, through its position, alpha or gamma, to a nuclear trivalent alkylated nitrogen atom, to another heterocyclic nucleus, through its nuclear carbon atom adjacent to a nuclear carbonyl group, such as carbonyl or thiocarbonyl, by a double bond, can be referred to as simple merocyanine dyes. When the double bond is replaced by a =CH—CH= group, the dyes can be called merocarbocyanines. When the double bond is replaced by a

=CH—CH=CH—CH= group, the dyes can be called merodicarbocyanines, etc. By choosing suitable starting materials, merodicarbocyanines can be made in a manner similar to that herein disclosed for merocarbocyanines. For a merodicarbocyanine dye, see my copending application Serial No. 752,036, filed November 8, 1934.

The compounds herein disclosed are useful as photographic sensitizers as described in my above referred to copending application. The term "dye" as applied to certain of the herein disclosed simple merocyanines is a loose usage, as some of these simpler compounds are possessed of a rather light color. On the other hand, some of the simple merocyanines, and the greater part of the merocarbocyanines, are of a deeper color.

What I claim as my invention and desire to be secured by Letters Patent of the United States is:

1. A merocyanine dye characterized by a formula selected from the group consisting of the following formulas:

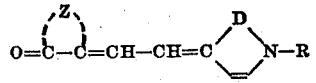

and

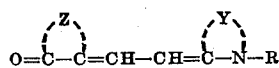

wherein R represents an alkyl group, D represents a phenylene group, Y represents the non-metallic atoms necessary to complete a heterocyclic nucleus selected from the group consisting of five-membered and six-membered heterocyclic nuclei and Z represents the non-metallic atoms necessary to complete a rhodanine nucleus.

2. A merocyanine dye characterized by the following formula:

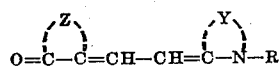

wherein R represents an alkyl group, Z represents the non-metallic atoms necessary to complete a rhodanine nucleus and Y represents the non-metallic atoms necessary to complete an azole nucleus.

3. A merocyanine dye characterized by the following formula:

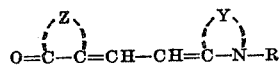

wherein R represents an alkyl group, Z represents the non-metallic atoms necessary to complete a rhodanine nucleus and Y represents the non-metallic atoms necessary to complete a nucleus of the thiazole series.

4. A merocyanine dye characterized by the following formula:

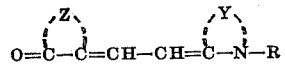

wherein R represents an alkyl group, Z represents the non-metallic atoms necessary to complete a rhodanine nucleus and Y represents the non-metallic atoms necessary to complete a benzothiazole nucleus.

5. 5-(2-ethyl-1-benzothiazylidene-ethylidene)-3-phenylrhodanine.

6. A merocyanine dye characterized by the following formula:

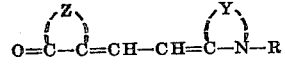

wherein R represents an alkyl group, Y represents the non-metallic atoms necessary to complete a quinoline nucleus and Z represents the non-metallic atoms necessary to complete a rhodanine nucleus.

7. A process for the preparation of a merocyanine dye comprising reacting, in the presence of a trialkylamine, a cyclammonium alkyl quaternary salt selected from the group consisting of five-membered and six-membered cyclammonium alkyl quaternary salts containing, in a reactive position, a β-anilinovinyl group with a heterocyclic compound selected from the group consisting of heterocyclic compounds containing a nuclear reactive methylene group adjacent to a nuclear carbonyl group selected from the group consisting of carbonyl and thiocarbonyl groups.

8. A process for the preparation of a merocyanine dye comprising reacting, in the presence of a trialkylamine, an azole alkyl quaternary salt containing, in its alpha position, a β-acetanilidovinyl group with a heterocyclic compound selected from the group consisting of heterocyclic compounds containing a nuclear reactive carbonyl group selected from the group consisting of carbonyl and thiocarbonyl groups.

9. A process for the preparation of a merocyanine dye comprising reacting, in the presence of a trialkylamine, an alkyl quaternary salt of the thiazole series containing, in its alpha position, a β-acetanilidovinyl group with a rhodanine.

10. 5 - (1-ethyl-2-quinolylidene-ethylidene)-3-phenylrhodanine.

11. A merocyanine dye characterized by the following formula:

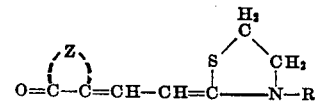

wherein R represents an alkyl group and Z represents the non-metallic atoms necessary to complete a rhodanine nucleus.

12. 5 - (3 - methyl - 2 - thiazolinylidene-ethylidene) -3-phenylrhodanine.

LESLIE G. S. BROOKER.